(12) United States Patent
Nyholm et al.

(10) Patent No.: US 11,939,446 B2
(45) Date of Patent: Mar. 26, 2024

(54) THERMALLY EXPANDABLE THERMOPLASTIC MICROSPHERES AND PROCESS FOR THEIR PREPARATION

(71) Applicant: Akzo Nobel Chemicals International B.V., Arnhem (NL)

(72) Inventors: Christina Nyholm, Sundsvall (SE); Per Anders Restorp, Sävedalen (SE); Anders Törncrona, Bohus (SE); Helena Bergenudd, Sundsvall (SE); Andreas Sundblom, Alingsås (SE); Bo Andreasson, Sundsvall (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 497 days.

(21) Appl. No.: 16/311,258

(22) PCT Filed: Jul. 11, 2017

(86) PCT No.: PCT/EP2017/067349
§ 371 (c)(1),
(2) Date: Dec. 19, 2018

(87) PCT Pub. No.: WO2018/011182
PCT Pub. Date: Jan. 18, 2018

(65) Prior Publication Data
US 2019/0233606 A1 Aug. 1, 2019

(30) Foreign Application Priority Data
Jul. 14, 2016 (EP) ..................................... 16179524

(51) Int. Cl.
*C08J 9/20* (2006.01)
*B01D 39/04* (2006.01)
*B01J 13/06* (2006.01)
*B01J 13/14* (2006.01)
*B01J 13/16* (2006.01)
*C08J 9/14* (2006.01)
*C08J 9/22* (2006.01)
*C08K 3/36* (2006.01)
*C08K 9/06* (2006.01)

(52) U.S. Cl.
CPC ............... *C08J 9/20* (2013.01); *B01D 39/04* (2013.01); *B01J 13/06* (2013.01); *B01J 13/14* (2013.01); *B01J 13/16* (2013.01); *C08J 9/141* (2013.01); *C08J 9/22* (2013.01); *C08K 3/36* (2013.01); *C08K 9/06* (2013.01); *C08J 2203/22* (2013.01); *C08J 2300/22* (2013.01); *C08J 2333/12* (2013.01); *C08J 2333/20* (2013.01); *C08J 2339/06* (2013.01)

(58) Field of Classification Search
CPC ....................................................... C08J 9/20
See application file for complete search history.

(56) References Cited

U.S. PATENT DOCUMENTS

| | | | |
|---|---|---|---|
| 3,359,130 A | 12/1967 | Goldman | |
| 3,615,972 A * | 10/1971 | Morehouse, Jr. | C08J 9/32 156/79 |
| 3,661,810 A * | 5/1972 | Gahmig | C08J 9/224 521/57 |
| 4,287,308 A | 9/1981 | Nakayama et al. | |
| 4,415,631 A * | 11/1983 | Schutijser | B01J 20/3219 428/405 |
| 5,985,943 A | 11/1999 | Hahn et al. | |
| 10,130,928 B2 * | 11/2018 | Nakatomi | H01M 4/134 |
| 2004/0077768 A1 | 4/2004 | Greenwood | |
| 2005/0079352 A1 | 4/2005 | Glorioso et al. | |
| 2008/0017338 A1* | 1/2008 | Nordin | B01J 13/14 162/103 |
| 2008/0245260 A1 | 10/2008 | Campazzi et al. | |
| 2010/0004348 A1 | 1/2010 | Braun et al. | |
| 2014/0000152 A1* | 1/2014 | Torncrona | B01F 17/0071 44/301 |

FOREIGN PATENT DOCUMENTS

| | | |
|---|---|---|
| CN | 101564668 A | 10/2009 |
| CN | 102702449 A | 10/2012 |
| EP | 1 977 883 A1 | 10/2008 |
| EP | 2 327 475 A2 | 6/2011 |
| JP | 2006326457 A | 12/2006 |

(Continued)

OTHER PUBLICATIONS

XP002773861—Database WPI; Week 200770; Thomson Scientific, London, GB; AN 2007-743798; Jul. 26, 2007 and JP 2007 187693 A (Toyo Ink MFG Co Ltd); Jul. 26, 2007 (abstract); 3 pgs.
George W. Sears, Jr.; "Determination of Specific Surface Area of Colloidal Silica by Titration with Sodium Hydroxide"; Analytical Chemistry, vol. 28, No. 12, Dec. 1956, pp. 1981-1983.
Jessica Fredlund; "Synthesis of Thermos Expandable Microspheres"; Master of Science Thesis, 2011; 45 pgs.
European Search Report issued in the counterpart European Application No. 16179524.0-1371 dated Jan. 10, 2017

(Continued)

*Primary Examiner* — Irina Krylova
(74) *Attorney, Agent, or Firm* — LORENZ & KOPF, LLP

(57) ABSTRACT

The invention relates to a process for the manufacture of thermally expandable thermoplastic microspheres. The process comprises, providing a mixture of monomeric materials suitable for polymerisation to form a thermoplastic polymer and at least one blowing agent, providing to the mixture a colloidal silica that is surface-modified with at least hydrophobic organosilane groups and forming an emulsion. A polymerisation is performed to form the thermally expandable thermoplastic microspheres. The invention further relates to thermally expandable thermoplastic micro spheres, expanded micro spheres and their use in the manufacture of products.

21 Claims, 1 Drawing Sheet

(56) References Cited

FOREIGN PATENT DOCUMENTS

| JP | 2007187693 A | | 7/2007 |
|---|---|---|---|
| WO | 2004/035473 A1 | | 4/2004 |
| WO | 2004/035474 A1 | | 4/2004 |
| WO | 2004/056549 A1 | | 7/2004 |
| WO | 2004/072160 A1 | | 8/2004 |
| WO | 2007/091960 A1 | | 8/2007 |
| WO | 2012/123386 A1 | | 9/2012 |
| WO | WO2015098586 | * | 7/2015 |

OTHER PUBLICATIONS

Notification of Transmittal of the International Search Report and the Written Opinion of the International Searching Authority, or the Declaration from the International Bureau of WIPO for International Application No. PCT/EP2017/067349 dated Sep. 26, 2017.

* cited by examiner

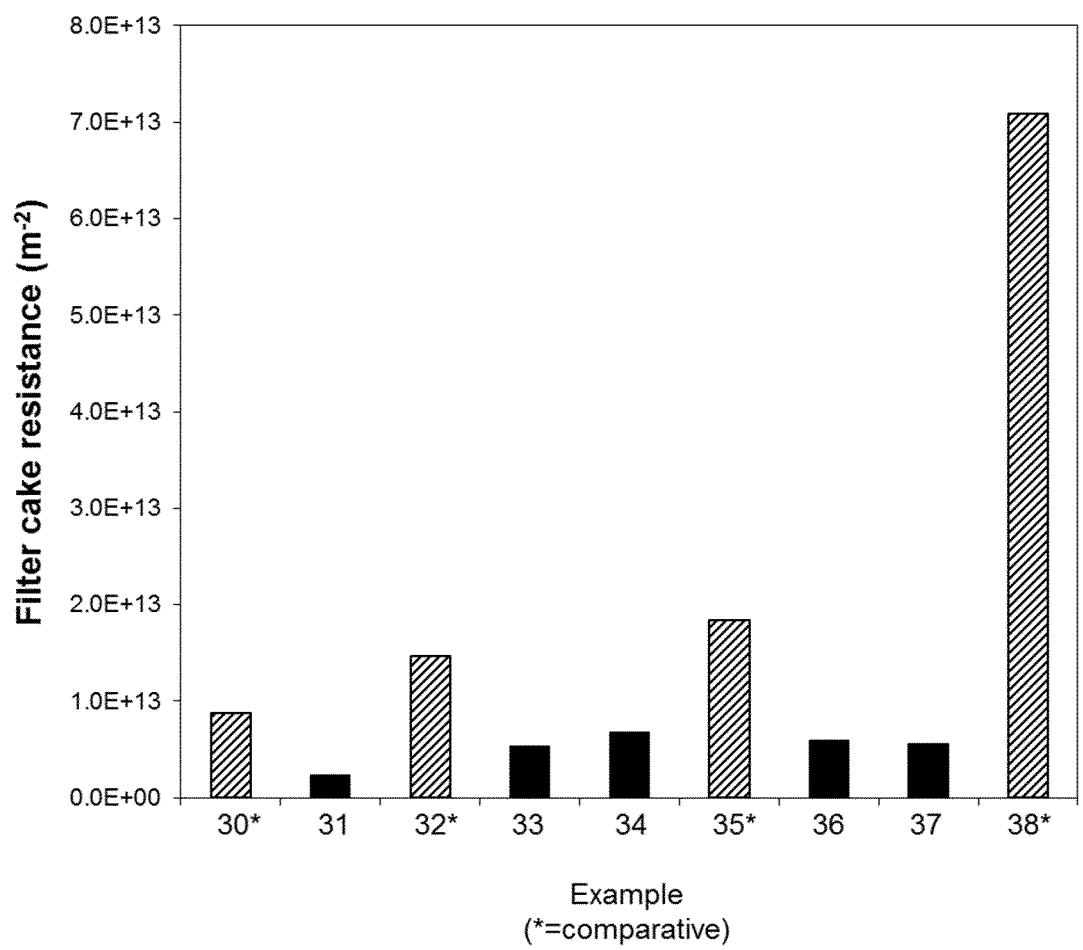

11,939,446 B2

THERMALLY EXPANDABLE THERMOPLASTIC MICROSPHERES AND PROCESS FOR THEIR PREPARATION

This application is a national stage filing under 35 U.S.C. § 371 of PCT/EP2017/067349, filed Jul. 11, 2017, which claims priority to European Patent Application No. 16179524.0 filed Jul. 14, 2016, the contents of which are each incorporated herein by reference in their entireties.

FIELD OF INVENTION

The present invention relates to a process for the manufacture of thermally expandable thermoplastic microspheres. The process utilises a colloidal silica that is surface-modified with at least one type of hydrophobic organosilane group. The present invention also relates to thermally expandable thermoplastic microspheres obtainable by the process. The present invention also relates to expanded microspheres. The present invention also relates to a product manufactured using the thermally expandable thermoplastic microspheres or the expanded microspheres.

BACKGROUND OF INVENTION

Thermally expandable thermoplastic microspheres are known in the art, as disclosed in, for example, U.S. Pat. No. 3,615,972 and WO2007/091960.

Thermally expandable thermoplastic microspheres comprise a thermoplastic shell encapsulating a blowing agent. The thermoplastic shell is usually a polymer of monomer(s). When heated the thermoplastic shell softens and simultaneously the blowing agent volatilizes while being retained within the thermoplastic shell, causing an expansion of the thermally expandable thermoplastic microspheres to form expanded microspheres.

Thermally expandable thermoplastic microspheres may be in a wet form (e.g. an aqueous slurry or a wet cake) or as a dry powder. The thermally expandable thermoplastic microspheres and the expanded microspheres have many uses, for example in a manufacture of paper (e.g. embossed paper, a paper filler, a sizing agent), inks, corks, cement based compositions, adhesives, foams, insulation materials, coatings, rubber-based products, fillers etc. to provide for example a lightweight filler in such applications.

A typical process for the manufacture of the thermally expandable thermoplastic microspheres is suspension-polymerisation. During this process for the manufacture of the thermally expandable thermoplastic microspheres, a so called oil-phase of emulsion droplets comprising the monomer(s) and blowing agent(s) is used in an aqueous phase. A polymerisation of the monomer(s) leads to an encapsulation of the blowing agent(s) within the consequently formed thermoplastic shell, forming the thermally expandable thermoplastic microspheres.

The emulsion droplets containing the monomer(s) and blowing agent(s) need to be stabilised and the polymerisation of the monomer(s) occurs in the emulsion droplets. The stabilisation of the emulsion droplets comprising the monomer(s) and blowing agent(s) can be achieved by Pickering emulsion using stabilising particles.

Stabilisation of the emulsion droplets is important for a number of reasons. Without stabilisation, coalescence of the emulsion droplets containing the monomer(s) and blowing agent(s) occurs which has negative effects; such as, a non-uniform emulsion droplet size distribution resulting in undesirable proportions of emulsion droplets with different sizes which in turn leads to undesirable properties of thermally expandable thermoplastic microspheres after polymerisation. Furthermore stabilisation is important for the prevention of aggregates of thermally expandable thermoplastic microspheres. Furthermore stabilisation is important to overcome problems such as the formation of non-uniform thermally expandable thermoplastic microspheres and/or the formation of a non-uniform thermoplastic shell and an incomplete thermoplastic shell of the thermally expandable thermoplastic microspheres.

An example of stabilising chemicals is a combination of silica particles with co-stabilisers. The silica particles may be provided in the form of a colloidal silica. The combination of the silica particles with co-stabilisers is used with the so called oil-phase before polymerisation. The silica particles with co-stabilisers provide a stabilising protective layer on a surface of the thermoplastic shell of the thermally expandable thermoplastic microspheres and the resultant expanded microspheres. Such a combination of silica particles and co-stabilisers is disclosed in U.S. Pat. No. 3,615,972. The co-stabilisers can be; metal ions (such as Cr(III), Cr(VI) or Fe(III)); a flocculant (such as a poly-condensate oligomer of adipic acid and diethanol amine) with sometimes a reducing agent. The metal ions interact with the silica particles and the flocculants preventing coalescence of the emulsion droplet and therefore stabilise the emulsion droplets.

EP 2327475 A2 discloses stabilising chemicals (dispersing stabiliser) of sodium chloride, an aluminate modified colloidal silica of Ludox-AM and an auxiliary agent for dispersing stabiliser such as polyvinylpyrolidone. Ludox-AM is a hydrophilic colloidal silica that is not surface modified with organosilane groups. The process of EP 2327475A2 requires a concentrated NaCl solution at low pH which is thus corrosive. Furthermore a concentrated NaCl solution at low pH will require washing of the final product. Furthermore under conditions of a concentrated NaCl solution at low pH a rapid and high degree of gellation of the colloidal silica occurs which in turn leads to undesirable polymerization of the monomers and therefore inconsistent sizes in the final products.

US 2005/0079351 A1 discloses stabilising chemicals of sodium chloride, a colloidal silica of Ludox HS-30, Poly-vinyl amine and sodium dichromate (which is toxic). The stabilising system is hydrophilic and like EP 2327475 A2 requires low pH. The aforementioned problems therefore exist.

WO 2004/072160 and U.S. Pat. No. 3,615,972 describe the formation of expandable microspheres in the presence of colloidal silica, in the presence of potassium dichromate with adjustment to low pH (pH of 4) using hydrochloric acid.

The use of co-stabilisers such as chromium pose numerous drawbacks. For example, metal ions can be harmful and/or toxic, hence their use in an aqueous environment may require safety measures such as specialist handling and/or specialist disposal. Metal residues remain in the product (thermally expandable thermoplastic microspheres, expanded microspheres), therefore the product may also require specialist handling, and may even preclude their use in certain applications, for example where contact with food or drink is possible. When the product (thermally expandable thermoplastic microspheres, expanded microspheres) is substantially dry, this is a somewhat dusty product and the presence of the metal poses health concerns as it can be airborne. The use of a flocculant such as poly-condensate oligomer of adipic acid and diethanol amine poses additional problems because the oligomer of adipic acid and diethanol amine undergoes hydrolysis during storage and is thus not storage stable. Therefore processes for proding thermally expandable microspheres using flocculants such as poly-condensate oligomer of adipic acid and diethanol amine are not repeatable and give inconsistent results over time. In order to improve consistency, flocculants such as poly-condensate oligomer of adipic acid and diethanol amine needs to be manufactured to the same chemical composition, and should ideally be used as soon as possible after manufacture.

Due to the complex system and its inherent variations there is risk for agglomeration and thus inferior properties in the end product, which would preclude the product for use in surface sensitive applications.

There is a need to overcome the aforementioned problems.

SUMMARY OF INVENTION

The aforementioned problems are overcome by the present invention.

In a first aspect the present invention relates to a process for the manufacture of thermally expandable thermoplastic microspheres. The process comprising providing a mixture of monomeric materials suitable for polymerisation to form a thermoplastic polymer and at least one blowing agent, providing to the mixture a colloidal silica that is surface-modified with at least hydrophobic organosilane groups to form an emulsion. Polymerisation is performed to form the thermally expandable thermoplastic microspheres.

By using colloidal silica that is surface-modified with at least hydrophobic organosilane groups, it has been surprisingly found that there is no need to use a mixture of metal ions, a flocculant (such as poly-condensate oligomer of adipic acid and diethanol amine) and often a reducing agent or highly concentrated corrosive salt solutions. By avoiding, or at least reducing, the need for these additional components, problems attributed to these components can be avoided, and the complexity of the process can also be reduced.

According to the present invention thermally expandable thermoplastic microspheres with enhanced filterability and dewatering of the thermally expandable thermoplastic microspheres are produced. Reproducibility for controlling size of the thermally expandable thermoplastic microspheres is apparent. In addition, less sieve residues in the form of agglomerates (polymerised monomeric materials not forming the thermoplastic shell) are observed, therefore a higher yield of product is achieved.

In further aspect the present invention relates to thermally expandable thermoplastic microspheres obtainable by the aforementioned process.

In a further aspect the present invention relates to expanded microspheres obtainable by heating the thermally expandable thermoplastic microspheres.

The colloidal silica that is surface-modified with at least hydrophobic organosilane groups provide a stabilising protective layer on a surface of the thermoplastic shell of the thermally expandable thermoplastic microspheres and the resultant expanded microspheres.

In a further aspect the present invention relates to a product manufactured using the thermally expandable thermoplastic microspheres or the expanded microspheres.

The products are preferably devoid of separately added metals, i.e. metals not already present in the source of colloidal silica. The colloidal silica may comprise alkali metal cations, for example up to 1 wt % alkali metal, such as in the range of from 0.2 to 0.5 wt %. In addition, alkaline earth metals, transition metals, lathanides or metals of Groups 13-16 of the periodic table may be present as impurities in the reagents used, although these will typically be no more than 0.1 wt % in total. Typically, no individual metal impurity is present in concentrations higher than 0.02 wt %.

In a further aspect the present invention relates to a use of a colloidal silica that is surface-modified with at least hydrophobic organosilane groups as a stabiliser in the manufacture of thermally expandable thermoplastic microspheres.

DETAILED DESCRIPTION

For a complete understanding of the present invention and the advantages thereof, reference is made to the following detailed description.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from different aspects and embodiments of the invention.

In a first aspect the present invention relates to a process for the manufacture of thermally expandable thermoplastic microspheres. The process comprising:
  providing a mixture of monomeric materials suitable for polymerisation to form a thermoplastic polymer and at least one blowing agent,
  providing thereto a colloidal silica that is surface-modified with at least hydrophobic organosilane groups and forming an emulsion; and
  polymerising to form thermally expandable thermoplastic microspheres.

The process comprises using a colloidal silica comprising one or more hydrophobic organosilane moieties, i.e. one or more organosilane moieties that are hydrophobic in nature. The hydrophobic organosilane-modified colloidal silica is then contacted with mixture comprising one or more monomers and one or more blowing agents.

The emulsion can be produced by contacting the mixture of one or more monomeric materials and at least one blowing agent with the surface-modified colloidal silica. Either can be added to the other, i.e. the surface-modified colloidal silica can be added to the monomer/blowing agent mixture, or vice versa.

As used herein the term "thermally expandable thermoplastic microspheres" relates to a thermoplastic shell encapsulating a blowing agent. The thermoplastic shell is usually a polymer of monomeric materials suitable for polymerisation to form the thermoplastic shell. When heated, the thermoplastic shell softens and simultaneously the blowing agent volatilizes and expands while being retained within the thermoplastic shell thus causing an expansion of the thermally expandable thermoplastic microspheres to form expanded microspheres.

The monomeric material(s) suitable for polymerisation to form the thermoplastic polymer can be at least one of alkenyl aromatic monomers, (meth)acrylate monomers, vinyl esters, vinyl nitriles, (meth)acryl amides, vinylidene halides, vinyl chloride, vinyl bromide and similar halogenated vinyl compounds, vinyl ethers, N-substituted maleimides, or any combination thereof.

By alkenyl aromatic monomers it is meant a compound according to the general formula:

wherein Ar represents an aromatic hydrocarbon or an aromatic halo-hydrocarbon of the benzene series. Examples of such alkenyl aromatic monomers are styrene, o-methylstyrene, m-methylstyrene, p-methylstyrene, ethylstyrene, vinyl-xylene, chlorostyrene, or bromostyrene.

By (meth)acrylate monomers it is meant a compound and isomers thereof according to the general formula:

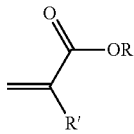

wherein R can be selected from the group consisting of hydrogen and an alkyl containing from about 1 to 12 carbon atoms and R' can be selected from the group consisting of hydrogen and methyl. Preferred (meth)acrylate monomers are methacrylic acid, methacrylic anhydride, methyl acrylate, methyl methacrylate, ethyl acrylate, propyl acrylate, butyl acrylate, butyl methacrylate, propyl methacrylate, lauryl acrylate, 2-ethylhexylacrylate, ethyl methacrylate, isobornyl methacrylate, hydroxyethyl (meth)acrylate, hydroxypropyl (meth)acrylate, polyethyleneglycol (meth)acrylate.

By vinyl ester monomers it is meant a compound and isomers thereof according to the general formula:

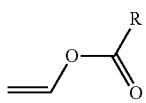

wherein R can be selected from an alkyl containing from 1 to 17 carbon atoms. Preferred vinyl ester monomers are vinyl acetate, vinyl butyrate, vinyl stearate, vinyl laurate, vinyl myristate and vinyl propionate.

By vinyl nitrile monomers it is meant a compound and isomers thereof according to the general formula:

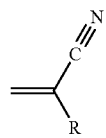

preferred vinyl nitrile monomers are acrylonitrile (R=H) and methacrylonitrile (R=CH$_3$).

By (meth)acryl amides monomers it is meant a compound and isomers thereof according to the general formula:

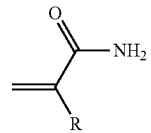

preferred (meth)acryl amides monomers are acrylamide (R=H) and methacrylamide (R=CH$_3$).

By N-substituted maleimide monomers it is meant a compound according to the general formula:

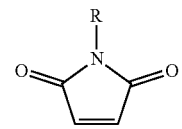

preferred N-substituted maleimide monomers are where is selected from R=H, R=CH$_3$, R=phenyl, R=cyclohexyl, R=halogen. It is preferable that R is selected from one of phenyl and cyclohexyl.

It is preferable that the monomeric material(s) suitable for polymerisation are selected from at least one of acrylonitrile, methacrylonitrile, methyl methacrylate, vinylidene chloride, methyl acrylate, methacrylic acid and methacrylamide and any combination thereof.

The at least one blowing agent can be a single compound or a combination of more than one compound. The at least one blowing agent has a boiling temperature below a softening temperature of the thermoplastic shell. The at least one blowing agent can be selected from hydrocarbons with 1 to 18 carbon atoms. The hydrocarbons can be saturated or unsaturated hydrocarbons. The hydrocarbons can be aliphatic, cyclic or aromatic hydrocarbons; preferred hydrocarbons are ethane, propane, butane, n-butane, iso-butane, n-pentane, iso-pentane, neo-pentane cyclo-pentane, hexane, iso-hexane, n-hexane, cyclohexane, heptane, iso-heptane, octane, iso-octane, decane, dodecane, iso-dodecane and hexadecane. The blowing agent can be selected from chlorinated or fluorinated hydrocarbons mentioned above; preferred chlorinated or fluorinated hydrocarbons are methyl chloride, methylene chloride, dichloroethane, trichloroethane, trichlorofluoromethane and perfluorinated hydrocarbons. The blowing agent can be selected from tetra-alkyl silanes such as tetramethyl silane, tri-methylethyl silane, tri-methylisopropyl silane and trimethyl n-propyl silane. The blowing agent can be selected from ethers including chlorinated or fluorinated ethers. It is preferable that the at least one blowing agent is selected from iso-butane, n-butane, iso-pentane and iso-octane.

The monomeric material(s) suitable for polymerisation to form a thermoplastic polymer and the at least one blowing agent are mixed together and form a so called oil-phase. The at least one blowing agent is usually added to the monomeric material(s) suitable for polymerisation to form the thermoplastic polymer in an amount in a range of 5-40 wt %, such as 10-40 wt % and preferably in an amount in a range of 10-30 wt % to ensure optimal encapsulation of the at least one blowing agent.

Water can be added to the surface-modified colloidal silica before mixing with the monomer/blowing agent mixture. Alternatively, additional water can be added to the mixture obtained by mixing colloidal silica with the monomer/blowing agent mixture. Preferably, water (if added) is added to the surface-modified colloidal silica before mixing.

Generally for 100 parts of oil-phase, the surface-modified colloidal silica is added in an amount in a range of 1-30 parts (by weight).

By colloidal silica (sometimes also referred to as a "silica sol") it is meant a colloidal dispersion of silica particles (i.e. surface-modified with at least one hydrophobic organosilane group) in a liquid phase. The liquid phase is preferably water.

The colloidal silica as noted is surface-modified with at least hydrophobic organosilane groups. Thus the surface can be modified with one hydrophobic organosilane group, or more than one organosilane group. The hydrophobic organosilane group(s) are covalently linked by a siloxane bond formed by a condensation of hydrophobic organosilane groups with a silica particle. The hydrophobic organosilane group(s) can be selected from alkyl, alkenyl and aryl silane groups, such as methylsilyl, dimethylsilyl, trimethylsilyl, propylsilyl, vinylsilyl, octylsilyl, phenylsilyl, mercaptopropylsilyl, methacrylamidopropylsilyl and iso-butylsilyl groups. Therefore it is to be understood that the colloidal silica that is surface-modified with at least hydrophobic organosilane groups can be methylsilyl, dimethylsilyl, trimethylsilyl, propylsilyl, vinylsilyl, octylsilyl, phenylsilyl, mercaptopropylsilyl, methacrylamidopropylsilyl and iso-butylsilyl surface modified.

The degree of surface modification of the surface-modified colloidal silica with the hydrophobic organosilane group(s) is up to 190%, which corresponds to an amount of 4.5 µmol hydrophobic organosilane groups per m² of the colloidal silica. The specific surface area (SSA) of the colloidal silica is measured before the colloidal silica is surface-modified with at least hydrophobic organosilane groups by Sears Titration (Determination of Specific Surface Area of Colloidal Silica by titration with Sodium Hydroxide, Sears, Analytical Chemistry, Vol. 28, No. 12, December 1956, pp 1981-1983). The SSA together with the silica concentration for the colloidal silica dispersion is then used to calculate how much silane should be added to attain a degree of surface-modification (for instance 4.5 µmol/m²).

Preferably, the degree of surface modification with the hydrophobic organosilane group(s) is in a range of 15-60% (0.35-1.42 µmol/m²). In embodiments, the degree of surface modification is approximately 15% (0.35 µmol/m²), 32.5% (0.77 µmol/m²), 40% (0.95 µmol/m²), 50% (1.18 µmol/m²) or 60% (1.42 µmol/m²).

The degree of surface modification can be calculated from the number of moles of organosilane reactant added to the colloidal silica during preparation of the surface-modified colloidal silica, and also from the surface area of the colloidal silica before its modification (determined for example by Sears titration). The following equation can be used:

$$DM = \frac{N_{Sil}}{W_{CS} \times C_{CS} \times SA_{CS}}$$

where:
$DM$=Degree of Surface Modification (µmol m$^{-2}$)
$N_{Sil}$=Quantity of organosilane added to the colloidal silica (µmol)
$W_{CS}$=Weight of colloidal silica to be modified (g)
$C_{CS}$=Amount of silica in the colloidal silica to be modified (wt %)
$SA_{CS}$=Surface area of the silica in the colloidal silica to be modified (m² g$^{-1}$)

In a further aspect the colloidal silica that is surface-modified with at least hydrophobic organosilane groups may in addition also be surface-modified with one or more hydrophilic organosilane silane groups. The surface modification can be carried out as previously disclosed. The hydrophilic organosilane silane group can be selected from hydroxylated alkyl, amino alkyl, ammonium alkyl, sulfonic acid alkyl and carboxylic acid alkyl group such as glycerol propyl silyl, methoxy polyethylene glycol silyl (MPEGsilyl), aminopropylsilyl, diethylenetriaminepropylsilyl, (2-aminoethyl)-3-aminopropylsilyl, butylaminopropylsilyl, N-methylaminopropylsilyl, N-phenylaminopropylsilyl, bis (2-hydroxyethyl)aminopropylsilyl, N,N-diethylaminopropylsilyl, (N-styrylmethyl-2-aminoethylamino)propylsilyl, triethylammoniumchloride propyl silyl, ureidopropylsilyl, hydroxypropylsilyl, propylsuccinic acid silyl, O-polyethyleneoxide urethane propyl silyl, and propanesulfonic acid silyl groups.

In embodiments, the total amount of hydrophobic and hydrophilic organosilanes is in the range of from 15% (0.35 µmol/m²) to 150% (3.55 µmol/m²), for example from 15% (0.35 µmol/m²) to 120% (2.82 µmol/m²) such as from 32.5% (0.77 µmol/m²) to 120% (2.82 µmol/m²). In embodiments, the total amount is 100% (2.37 µmol/m²).

Where the colloidal silica that is surface-modified with at least hydrophobic organosilane groups is also surface modified with hydrophilic organosilane silane groups, a proportion of the degree of surface modification of hydrophobic organosilane/hydrophilic organosilane is preferably in an amount in range of 15%/85% to 60%/40%, for example 15%/85%, 32.5%/67.5%, 40%/60%, 50%/50% or 60%/40%.

The colloidal silica that is surface-modified with at least hydrophobic organosilane groups (i.e. may also be surface modified with hydrophilic organosilane groups) has a solid content of up to 60 wt % (i.e. silica that is surface-modified) and preferably in a range of 20-60 wt %, such as approximately 30 wt %, approximately 40 wt % and approximately 50 wt %.

Modification a colloidal silica with hydrophobic or hydrophilic organosilane moieties can be manufactured by methods such as those described in US2008/0245260 A1, WO2012/123386, WO 2004/035473 and WO 2004/035474, the teachings of which are incorporated herein by reference. These typically entail the addition of an organosilane compound (i.e. an organosilane reactant) to an unfunctionalised colloidal silica. The silane reactant compounds are typically alkoxysilanes or halosilanes, comprising for example from 1 to 3 alkoxy or halo substituents on the silicon atom of the organosilane moiety, i.e. $R_nSiX_{4-n}$, where R is the organo group, X is (for example) alkoxy or halide, and n is from 1 to 3, typically from 1 to 2, for example 1. Alkoxy groups are typically selected from $C_1$ to $C_4$ alkoxy, and halide groups are typically chloride or bromide, for example chloride.

The colloidal silica that is surface-modified with at least hydrophobic organosilane groups preferably has an average particle size in a range of 2-150 nm in diameter and more preferably in a range of 7-100 nm in diameter.

The particle size can be measured according to the SSA of the colloidal silica before surface modification according to the formula, particle size (nm)=2727/SSA (m$^2$/g), as used in the present invention. The average particle size can also be measured by ES-DMA (electro-spray differential mobility analyser), CLS (centrifugal liquid analyser), SEM (scanning electron microscopy) or TEM (transmission electron microscopy).

It is preferable that a pH of the colloidal silica that is surface-modified with at least hydrophobic organosilane groups (i.e. may also be surface modified with hydrophilic organosilane silane groups) with water is in a range of 1-7, and more preferably in is in a range of 3-5. A stabilising effect of the formed emulsion is improved having a pH in the aforementioned ranges. In order to achieve the desired pH acetic acid is used to lower the pH to the desired range and NaOH is used to raise the pH to the desired range.

The mixture of monomeric material(s) suitable for polymerisation to form the thermoplastic polymer and the at least one blowing agent is provided with the colloidal silica that is surface-modified with at least hydrophobic organosilane groups and an emulsion formed prior to the polymerisation.

Prior to the polymerisation, the emulsion is formed, for example by, stirring, agitation. The emulsion formation allows for a manipulation of a size of the resultant emulsion droplets. It is preferable that the emulsion droplets have a mean average diameter of up to 100 microns and preferably in a range of 3-40 microns and more preferably in a range of 2-10 microns. A size of the emulsion droplets may determine a size of the thermally expandable thermoplastic microspheres as described in U.S. Pat. No. 3,615,972. The emulsion formation may be performed by devices known in the art to provide emulsion droplets having a mean average diameter within the aforementioned range.

In addition a cross-linker may be used with the monomeric material(s) suitable for polymerisation. The cross-linker is present in an amount in a range of 0.1-10 wt % of the monomeric materials suitable for polymerisation, more preferably 0.1-3 wt % and even more preferably 0.1-1 wt %. The cross-linker can be selected from at least one of divinyl benzene, ethylene glycol di(meth)acrylate, di(ethylene glycol) di(meth)acrylate, triethylene glycol di(meth)acrylate, propylene glycol di(meth)acrylate, 1,4-butanediol di(meth) acrylate, 1,6-hexanediol di(meth)acrylate, glycerol di(meth) acrylate, 1,3-butanediol di(meth)acrylate, neopentyl glycol di(meth)acrylate, 1,10-decanediol di(meth)acrylate, pentaerythritol tri(meth)acrylate, pentaerythritol tetra(meth) acrylate, dipentaerythritol hexa(meth)acrylate, triallylformal tri(meth)acrylate, allyl methacrylate, trimethylolpropane trimethacrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal, triallyl isocyanate, triallyl isocyanurate and trivinylcyclohexane or any combination thereof.

The polymerisation is then performed to form the thermally expandable thermoplastic microspheres. It is to be appreciated that polymerisation forms a polymer of the monomeric materials suitable for polymerisation as noted above. The polymerisation is generally performed by heating in a single step or in a number of steps. The heating step can be performed at a temperature in a range of 40-90° C. for a time in a range of 5-20 Hours (Hrs), and more preferably at a temperature in a range of 50-80° C. for a time in a range of 5-20 Hrs.

To facilitate the polymerisation, a polymerisation catalyst may be used. The polymerisation catalyst may be added in an amount in a range of 0.1-5 parts for every 100 parts of the oil-phase. The polymerisation catalyst may be selected from at least one of organic peroxides such as dialkyl peroxides, diacyl peroxides, peroxy esters, peroxy dicarbonates, or azo compounds or any combination thereof. The polymerisation catalyst may be selected from at least one of dicetyl peroxydicarbonate, tert-butyl cyclohexyl peroxy dicarbonate, dioctanyl peroxide, dibenzoyl peroxide, dilauroyl peroxide, didecanoyl peroxide, tert-butyl peracetate, tert-butyl perlaurate, tert-butyl perbenzoate, tert-butyl hydroperoxide, cumene hydroperoxide, cumene ethylperoxide, diisopropyl hydroxy dicarboxylate, azo-bis dimethyl valeronitrile, azo-bis isobutyronitrile, azo-bis(cyclohexylcarbonitrile), di(4-tert-butylcyclohexyl) peroxydicarbonate, or any combination thereof.

Following polymerisation, the microspheres may be post-treated to reduce an amount of unreacted monomeric materials suitable for polymerisation, the post treatment may be carried out, for example according to a process described in WO2004/072160 or U.S. Pat. No. 4,287,308 the teachings of which are incorporated herein by reference.

The resultant thermally expandable thermoplastic microspheres are obtained as an aqueous slurry.

The thermally expandable thermoplastic microspheres within the aqueous slurry may then preferably be passed through a sieve with apertures of up to 1000 μm, more preferably up to 100 μm and even more preferably up to 63 μm. Passing the slurry through the sieve removes residues and polymer aggregates not part of the thermally expandable thermoplastic microspheres. In preferred embodiments, before filtration, the amount of polymer aggregate is less than 0.1 wt %, more preferably less than 0.05 wt %, and even more preferably less than 0.03 wt %. It is preferable that the filtrate thus contains the manufactured thermally expandable thermoplastic microspheres with a mean particle size in a range of 1-100 μm diameter and more preferably 3-40 μm diameter.

The mean particle size and size distribution of the thermally expandable thermoplastic microspheres within the aqueous slurry can be determined by laser light scattering on a Malvern Mastersizer Hydro G 2000 apparatus on wet samples. The mean particle size is presented as the volume median diameter d(0.5).

The aqueous slurry can be dewatered to form a wet cake of thermally expandable thermoplastic microspheres, by using, for example, bed filtering, filter pressing, leaf filtering, rotary filtering, belt filtering and centrifuging or any combination thereof. A wet cake of thermally expandable thermoplastic microspheres is advantageous for transportation of the thermally expandable thermoplastic microspheres as it has a generally low volume, low weight and is not dusty compared to a dry product of thermally expandable thermoplastic microspheres Furthermore the aqueous slurry or wet cake may be dried to remove water, by using, for example, spray drying, shelf drying, tunnel drying, rotary drying, drum drying, pneumatic drying, turbo shelf drying, disc drying and fluidised bed-drying to provide dry thermally expandable thermoplastic microspheres.

The thermally expandable thermoplastic microspheres can be heated by processes known in the art to form the expanded microspheres. Expansion properties of the thermally expandable thermoplastic microspheres can be evaluated on a Mettler TMA 841 and a PC with STARe software using a heating rate of 20° C./min and a load (net.) of 0.06 N. $T_{start}$ is the temperature at which the expansion starts, $T_{max}$ is the temperature at which maximum expansion is obtained and the density is the density at $T_{max}$.

Generally thermally expandable thermoplastic microspheres and/or expanded microspheres are useful in the manufacture of various products as known in the art, for example as lightweight filler. The thermally expandable thermoplastic microspheres (in the form of, for example, an aqueous slurry, a wet cake or dry) and/or the expanded microspheres (in the form of, for example, a wet cake or dry) of the present invention are used in the manufacture of products such as paper making, inks (waterborne inks, solvent borne inks, UV-curing inks), plastisols, textiles, paper fillers, putties, sealants, underbody coatings, adhesives, leathers (artificial and genuine), paints, boards, coatings (e.g anti-slip coating etc.), explosives, cable insulations, thermoplastics (such as polyethylene, polyvinyl chloride, and ethylene-vinylacetate), thermoplastic elastomers (such as styrene-ethylene-butylene-styrene co-polymer, styrene-butadiene-styrene co-polymer, thermoplastic polyurethanes and thermoplastic polyolefins), styrene-butadiene rubber, natural rubber, vulcanized rubber, silicone rubbers, thermosetting polymers (such as epoxies, polyurethanes and polyesters). In some of these product applications the thermally expandable thermoplastic microspheres and/or expanded microspheres are particularly advantageous, such as in putties, sealants, toy-clays, genuine leather, paint, explosives, cable insulations and thermosetting polymers (like epoxies, polyurethanes and polyesters). The thermally expandable thermoplastic microspheres and expanded microspheres of the present invention are particularly advantageous for such product applications as their manufacture process and direct use in such applications means no metal is incorporated in the final product applications which may be incompatible with the final product applications.

The present invention is demonstrated by the following non-limiting examples. Quantities of components specified in "parts" are by weight, unless otherwise specified.

Example 1

A dispersion comprising water (227 parts), colloidal silica (Bindzil 40 wt %, 130 m²/g, particle size 22 nm) surface-modified with 35% methacrylamidopropylsilyl (hydrophobic) (8 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 8.9 µm.

The thermally expandable thermoplastic microspheres were heated to form expanded microspheres and had a $T_{start}$ of 141° C. and a $T_{max}$ of 147° C. The density of the expanded microspheres was 46.2 gL$^{-1}$.

Example 2

A dispersion comprising water (221 parts), colloidal silica (Bindzil 40 wt %, 130 m²/g, particle size 22 nm) surface-modified with 35% mercaptopropylsilyl (hydrophobic) (11 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 11.8 µm.

The thermally expandable thermoplastic microspheres were heated to form expanded microspheres and had a $T_{start}$ of 137° C. and a $T_{max}$ of 148° C. The density of the expanded microspheres was 19.0 gL$^{-1}$.

Example 3

A dispersion comprising water (221 parts), colloidal silica (Bindzil 40 wt %, 130 m²/g, particle size 22 nm) surface-modified with 17% phenylsilyl (hydrophobic) (8 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 5.3 µm.

The thermally expandable thermoplastic microspheres were heated to form expanded microspheres and had a $T_{start}$ of 136° C. and a $T_{max}$ of 148° C. The density of the expanded microspheres was 21.9 gL$^{-1}$.

Example 4

A dispersion comprising water (221 parts), colloidal silica (Bindzil 40 wt %, 130 m²/g, particle size 22 nm) surface-modified with 33% iso-butylsilyl (hydrophobic) (11 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 6.2 µm.

The thermally expandable thermoplastic microspheres were heated to form expanded microspheres and had a $T_{start}$ of 135° C. and a $T_{max}$ of 148° C. The density of the expanded microspheres was 18.0 gL$^{-1}$.

Example 5

A dispersion comprising water (221 parts), colloidal silica (Bindzil 40 wt %, 130 m²/g, particle size 22 nm) surface-modified with 43% vinylsilyl (hydrophobic) (11 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 7.9 μm.

The thermally expandable thermoplastic microspheres were heated to form expanded microspheres and had a $T_{start}$ of 139° C. and a $T_{max}$ of 147° C. The density of the expanded microspheres was 24.6 gL$^{-1}$.

Example 6

A dispersion comprising water (221 parts), colloidal silica (Bindzil 40 wt %, 130 m$^2$/g, particle size 22 nm) surface-modified with 50% propylsilyl (hydrophobic) (11 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 6.2 μm.

The thermally expandable thermoplastic microspheres were heated to form expanded microspheres and had a $T_{start}$ of 134° C. and a $T_{max}$ of 149° C. The density of the expanded microspheres was 19.8 gL$^{-1}$.

Example 7

As Example 4 but the colloidal silica was surface-modified with 50% vinylsilyl (hydrophobic).

The resultant thermally expandable thermoplastic microspheres had a particle diameter of 9.0 μm.

The thermally expandable thermoplastic microspheres were heated to form expanded microspheres and had a $T_{start}$ of 140° C. and a $T_{max}$ of 148° C. The density of the expanded microspheres was 20.0 gL$^{-1}$.

Example 8

A dispersion comprising water (204 parts), colloidal silica (Bindzil 30 wt %, 360 m$^2$/g, particle size 7 nm) surface-modified with 15% propylsilyl (hydrophobic)/85% glycerolpropylsilyl (hydrophilic) (14 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 10 Hr.

The resultant thermally expandable thermoplastic microspheres had a particle diameter of 3.5 μm.

The thermally expandable thermoplastic microspheres were heated to form expanded microspheres and had a $T_{start}$ of 140° C. and a $T_{max}$ of 155° C. The density of the expanded microspheres was 47.6 gL$^{-1}$.

Example 9

A dispersion comprising water (211 parts), colloidal silica (Levasil 50 wt %, 50 m$^2$/g, particle size 60 nm) surface-modified with 15% propylsilyl (hydrophobic)/85% glycerolpropylsilyl (hydrophilic) (12 parts) and polymerisation catalyst di(4-tert-butylcyclohexyl) peroxydicarbonate (0.7 parts) was prepared and maintained at a pH of approx. 4.5. The aqueous dispersion was mixed with an oily phase of monomers acrylonitrile (34 parts), methyl methacrylate (9 parts), vinylidene chloride (57 parts) and blowing agent iso-pentane (16 parts) and a cross-linker trimethylolpropane trimethacrylate (0.36 parts).

The mixture was stirred and the polymerisation was performed in a sealed container at 56° C. for 4 Hr and then at 66° C. for 4 Hr.

The resultant thermally expandable thermoplastic microspheres had a particle diameter of 39.3 μm.

The thermally expandable thermoplastic microspheres were heated to form expanded microspheres and had a $T_{start}$ of 93° C. and a $T_{max}$ of 146° C. The density of the expanded microspheres was 32.5 gL$^{-1}$.

Example 10

A dispersion comprising water (216 parts), colloidal silica (Levasil 50 wt %, 50 m$^2$/g, particle size 60 nm) surface-modified with 32.5% propylsilyl (hydrophobic)/67.5% glycerolpropylsilyl (hydrophilic) (8 parts) and polymerisation catalyst di(4-tert-butylcyclohexyl) peroxydicarbonate (0.4 parts) was prepared and maintained at a pH of approx. 4.5. The aqueous dispersion was mixed with an oily phase of monomers acrylonitrile (58 parts), methyl methacrylate (42 parts) and blowing agent iso-pentane (20 parts) and a cross-linker trimethylolpropane trimethacrylate (0.36 parts).

The mixture was stirred and the polymerisation was performed in a sealed container at 58° C. for 4 Hr and then at 62° C. for 4 Hr.

The resultant thermally expandable thermoplastic microspheres had a particle diameter of 30.9 μm.

The thermally expandable thermoplastic microspheres were heated to form expanded microspheres and had a $T_{start}$ of 122° C. and a $T_{max}$ of 160° C. The density of the expanded microspheres was 14.1 gL$^{-1}$.

Example 11

A dispersion comprising water (251 parts), colloidal silica (Bindzil 50 wt %, 80 m$^2$/g, particle size 32 nm) surface-modified with 45% propylsilyl (hydrophobic)/55% glycerolpropylsilyl (hydrophilic) (8 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-butane (17 parts) and a cross-linker trimethylolpropane trimethacrylate (0.35 parts).

The mixture was stirred and the polymerisation was performed in a sealed container at 57° C. for 5 Hr and then at 66° C. for 4 Hr.

The resultant thermally expandable thermoplastic microspheres had a particle diameter of 11.0 μm.

The thermally expandable thermoplastic microspheres were heated to form expanded microspheres and had a $T_{start}$ of 103° C. and a $T_{max}$ of 150° C. The density of the expanded microspheres was 14.7 gL$^{-1}$.

Example 12

A dispersion comprising water (220 parts), colloidal silica (Bindzil 30 wt %, 220 m$^2$/g, particle size 12 nm) surface-modified with 50% propylsilyl (hydrophobic)/50% glycerolpropylsilyl (hydrophilic) (8 parts) and polymerisation catalyst dicetyl peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 6.3 μm.

The thermally expandable thermoplastic microspheres were heated to form expanded microspheres and had a $T_{start}$ of 131° C. and a $T_{max}$ of 148° C. The density of the expanded microspheres was 25.9 gL$^{-1}$.

Example 13

A dispersion comprising water (227 parts), colloidal silica (Bindzil 50 wt %, 80 m$^2$/g, particle size 32 nm) surface-modified with 50% propylsilyl (hydrophobic)/50% glycerolpropylsilyl (hydrophilic) (11 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 5.5 μm.

The thermally expandable thermoplastic microspheres were heated to form expanded microspheres and had a $T_{start}$ of 140° C. and a $T_{max}$ of 148° C. The density of the expanded microspheres was 18.6 gL$^{-1}$.

Example 14

A dispersion comprising water (184 parts) and colloidal silica (Bindzil 50 wt %, 80 m$^2$/g, particle size 32 nm) surface-modified with 50% propylsilyl (hydrophobic)/50% glycerolpropylsilyl (hydrophilic) (15 parts) and sodium chloride (69 parts) was prepared and maintained at a pH of approx. 3.2. The aqueous dispersion was mixed with an oily phase of monomers acrylonitrile (18 parts), methacrylonitrile (18 parts), methyl acrylate (10 parts), methacrylic acid (54 parts) and blowing agent iso-octane (35 parts), a cross-linker trimethylolpropane trimethacrylate (0.33 parts) and polymerization catalyst dilauryl peroxide (2.1 parts).

The mixture was stirred and the polymerisation was performed in a sealed container at 62° C. for 7 Hr and then 80° C. for 4 Hr.

The resultant thermally expandable thermoplastic microspheres had a particle diameter of 29.6 μm.

The thermally expandable thermoplastic microspheres were heated to form expanded microspheres and had a $T_{start}$ of 209° C. and a $T_{max}$ of 235° C. The density of the expanded microspheres was 50.9 gL$^{-1}$.

Example 15

A dispersion comprising water (216 parts), colloidal silica (Bindzil 40 wt %, 130 m$^2$/g, particle size 22 nm) surface-modified with 22% octylsilyl (hydrophobic)/65% glycerolpropylsilyl (hydrophilic) (10 parts) and polymerisation catalyst di (4-tert-butylcyclohexyl) peroxydicarbonate (0.4 parts) was prepared and maintained at a pH of approx. 4.5. The aqueous dispersion was mixed with an oily phase of monomers acrylonitrile (34 parts), methyl methacrylate (9 parts), vinylidene chloride (57 parts) and blowing agent iso-pentane (20 parts) and a cross-linker trimethylolpropane trimethacrylate (0.36 parts).

The mixture was stirred and the polymerisation was performed in a sealed container at 57° C. for 13 Hr.

The resultant thermally expandable thermoplastic microspheres had a particle diameter of 5.6 μm.

The thermally expandable thermoplastic microspheres were heated to form expanded microspheres and had a $T_{start}$ of 138° C. and a $T_{max}$ of 146° C. The density of the expanded microspheres was 28.2 gL$^{-1}$.

Example 16

A dispersion comprising water (227 parts), colloidal silica (Bindzil 40 wt %, 130 m$^2$/g, particle size 22 nm) surface-modified with 22% phenylsilyl (hydrophobic)/65% glycerolpropylsilyl (hydrophilic) (8 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 4.3 μm.

The thermally expandable thermoplastic microspheres were heated to form expanded microspheres and had a $T_{start}$ of 140° C. and a $T_{max}$ of 149° C. The density of the expanded microspheres was 34.7 gL$^{-1}$.

Example 17

A dispersion comprising water (330 parts) and colloidal silica (Levasil 50 wt %, 50 m$^2$/g, particle size 60 nm) surface-modified with 40% propylsilyl (hydrophobic)/60% glycerolpropylsilyl (hydrophilic) (29 parts) was prepared and maintained at a pH of approx. 4.5. The aqueous dispersion was mixed with an oily phase of monomers acrylonitrile (65 parts), methacrylonitrile (33 parts), methyl methacrylate (2 parts) and blowing agent iso-pentane (23 parts) and a cross-linker trimethylolpropane trimethacrylate (0.44 parts) and polymerisation catalyst dilauryl peroxide (2.0 parts).

The mixture was stirred and the polymerisation was performed in a sealed container at 62° C. for 6 Hr and then 80° C. for 4 Hr.

The resultant thermally expandable thermoplastic microspheres had a particle diameter of 6.7 μm.

The thermally expandable thermoplastic microspheres were heated to form expanded microspheres and had a $T_{start}$ of 140° C. and a $T_{max}$ of 163° C. The density of the expanded microspheres was 24.3 gL$^{-1}$.

Example 18

A dispersion comprising water (230 parts) and colloidal silica (Levasil 50 wt %, 50 m$^2$/g, particle size 60 nm)

surface-modified with 40% propylsilyl (hydrophobic)/60% glycerolpropylsilyl (hydrophilic) (15 parts) was prepared and maintained at a pH of approx. 4.5. The aqueous dispersion was mixed with an oily phase of monomers acrylonitrile (65 parts) and methacrylonitrile (35 parts) and blowing agent iso-pentane (35 parts) and a cross-linker trimethylolpropane trimethacrylate (0.33 parts) and polymerisation catalyst dilauryl peroxide (2.1 parts).

The mixture was stirred and the polymerisation was performed in a sealed container at 62° C. for 7 Hr and then at 80° C. for 4 Hr.

The resultant thermally expandable thermoplastic microspheres had a particle diameter of 28.2 μm.

The thermally expandable thermoplastic microspheres were heated to form expanded microspheres and had a $T_{start}$ of 123° C. and a $T_{max}$ of 182° C. The density of the expanded microspheres was 5.4 $gL^{-1}$.

Example 19

A dispersion comprising water (216 parts), colloidal silica (Bindzil 40 wt %, 130 $m^2/g$, particle size 22 nm) surface-modified with 60% propylsilyl (hydrophobic)/40% glycerolpropylsilyl (hydrophilic) (5 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (42 parts) and blowing agent iso-pentane (20 parts) and a cross-linker trimethylolpropane trimethacrylate (0.36 parts).

The mixture was stirred and the polymerisation was performed in a sealed container at 58° C. for 4 Hr and then at 62° C. for 4 Hr.

The resultant thermally expandable thermoplastic microspheres had a particle diameter of 4.9 μm.

The thermally expandable thermoplastic microspheres were heated to form expanded microspheres and had a $T_{start}$ of 137° C. and a $T_{max}$ of 149° C. The density of the expanded microspheres was 22.4 $gL^{-1}$.

Example 20

A dispersion comprising water (216 parts), colloidal silica (Bindzil 40 wt %, 130 $m^2/g$, particle size 22 nm) surface-modified with 17% octylsilyl (hydrophobic) (10 parts) and polymerisation catalyst di(4-tert-butylcyclohexyl) peroxydicarbonate (0.4 parts) was prepared and maintained at a pH of approx. 4.5. The aqueous dispersion was mixed with an oily phase of monomers acrylonitrile (58 parts), methyl methacrylate (42 parts) and blowing agent iso-pentane (20 parts) and a cross-linker trimethylolpropane trimethacrylate (0.36 parts).

The mixture was stirred and the polymerisation was performed in a sealed container at 57° C. for 13 Hr.

The resultant thermally expandable thermoplastic microspheres had a particle diameter of 14.9 μm.

The thermally expandable thermoplastic microspheres were heated to form expanded microspheres and had a $T_{start}$ of 138° C. and a $T_{max}$ of 155° C. The density of the expanded microspheres was 19.6 $gL^{-1}$.

Example 21

A dispersion comprising water (221 parts), colloidal silica (Bindzil 40 wt %, 170 $m^2/g$, particle size 16 nm) surface-modified with 113% methylsilyl (hydrophobic) (11 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 4.8 μm.

The thermally expandable thermoplastic microspheres were heated to form expanded microspheres and had a $T_{start}$ of 139° C. and a $T_{max}$ of 148° C. The density of the expanded microspheres was 28.6 $gL^{-1}$.

Example 22

A dispersion comprising water (227 parts), colloidal silica (Bindzil 40 wt %, 130 $m^2/g$, particle size 22 nm) surface-modified with 43% vinylsilyl (hydrophobic)/43% glycerolpropylsilyl (hydrophilic) (8 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred and the polymerisation was performed in a sealed container at 57° C. for 20 Hr.

The resultant thermally expandable thermoplastic microspheres had a particle diameter of 7.3 μm.

The thermally expandable thermoplastic microspheres were heated to form expanded microspheres and had a $T_{start}$ of 140° C. and a $T_{max}$ of 147° C. The density of the expanded microspheres was 26.6 $gL^{-1}$.

Example 23

A dispersion comprising water (279 parts), colloidal silica (Bindzil 40 wt %, 130 $m^2/g$, particle size 22 nm) surface-modified with 50% propylsilyl (hydrophobic)/50% glycerolpropylsilyl (hydrophilic) (11 parts) and polymerisation catalyst di(4-tert-butylcyclohexyl) peroxydicarbonate (0.3 parts) was prepared and maintained at a pH of approx. 4.5. The aqueous dispersion was mixed with an oily phase of monomers acrylonitrile (55 parts), methacrylonitrile (10 parts), methyl acrylate (35 parts) and blowing agent iso-butane (16 parts) and a cross-linker trimethylolpropane trimethacrylate (0.38 parts).

The mixture was stirred and the polymerisation was performed in a sealed container at 57° C. for 7 Hr.

The resultant thermally expandable thermoplastic microspheres had a particle diameter of 4.5 μm.

The thermally expandable thermoplastic microspheres were heated to form expanded microspheres and had a $T_{start}$ of 95° C. and a $T_{max}$ of 121° C. The density of the expanded microspheres was 26.6 $gL^{-1}$.

Example 24—Comparative

A dispersion comprising water (216 parts), colloidal silica (Bindzil 40 wt %, 220 $m^2/g$, particle size 12 nm) (5 parts), polymerisation catalyst di(4-tert-butylcyclohexyl) peroxydicarbonate (0.4 parts) and a poly-condensate oligomer of adipic acid and diethanol amine (0.9 parts) was prepared and maintained at a pH of approx. 4.5. The aqueous dispersion was mixed with an oily phase of monomers acrylonitrile (58 parts), methyl methacrylate (42 parts) and blowing agent iso-pentane (20 parts) and a cross-linker trimethylolpropane trimethacrylate (0.36 parts).

The mixture was stirred. Iron nitrate was added (0.05 parts) and the polymerisation was performed in a sealed container at 58° C. for 4 Hr and then 62° C. for 4 Hr.

The resultant thermally expandable thermoplastic microspheres had a particle diameter of 9.1 μm.

The thermally expandable thermoplastic microspheres were heated to form expanded microspheres and had a $T_{start}$ of 142° C. and a $T_{max}$ of 152° C. The density of the expanded microspheres was 20.3 gL$^{-1}$.

Example 25—Comparative

A dispersion comprising water (252 parts), colloidal silica (Bindzil 40 wt %, 220 m$^2$/g, particle size 12 nm) (6 parts), chromium nitrate (0.15 parts), a reducing agent sodium formaldehydesulfoxylate (0.05 parts), polymerisation catalyst di(4-tert-butylcyclohexyl) peroxydicarbonate (0.5 parts) and a poly-condensate oligomer of adipic acid and diethanol amine (0.7 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-butane (17 parts) and a cross-linker trimethylolpropane trimethacrylate (0.37 parts).

The mixture was stirred and the polymerisation was performed in a sealed container at 57° C. for 3 Hr and then 66° C. for 3 Hr 10 min.

The resultant thermally expandable thermoplastic microspheres had a particle diameter of 9.5 μm.

The thermally expandable thermoplastic microspheres were heated to form expanded microspheres and had a $T_{start}$ of 104° C. and a $T_{max}$ of 148° C. The density of the expanded microspheres was 12.9 gL$^{-1}$.

Example 26—Comparative

A dispersion comprising water (232 parts), colloidal silica (Bindzil 40 wt %, 220 m$^2$/g, particle size 12 nm) (5 parts), chromium nitrate (0.45 parts) and a polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred vigorously to the desired droplet size and the polymerisation was performed in a sealed container at 57° C. for 20 Hr. The result was an unstable system with mostly agglomerates and a poor yield of microspheres.

Example 27—Comparative

A dispersion comprising water (233 parts), colloidal silica (Bindzil 40 wt %, 220 m$^2$/g, particle size 12 nm) (5 parts), polymerisation catalyst di(4-tert-butylcyclohexyl) peroxydicarbonate (0.5 parts) and a poly-condensate oligomer of adipic acid and diethanol amine (0.6 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred vigorously to the desired droplet size and the polymerisation was performed in a sealed container at 57° C. for 20 Hr.

The result was an unstable system with mostly agglomerates and a poor yield of microspheres.

Example 28—Comparative

A dispersion comprising water (234 parts), colloidal silica (Bindzil 40 wt %, 220 m$^2$/g, particle size 12 nm) (5 parts) and a polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred vigorously to the desired droplet size and the polymerisation was performed in a sealed container at 57° C. for 20 Hr.

The result was an unstable system with mostly agglomerates and a poor yield of microspheres.

Example 29—Comparative

A dispersion comprising water (221 parts), colloidal silica (Bindzil 30 wt %, 360 m$^2$/g, particle size 7 nm) surface-modified with 100% glycerolpropylsilyl (hydrophilic) (8 parts) and polymerisation catalyst di(4-tert-butylcyclohexyl) peroxydicarbonate (0.5 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-pentane (16 parts) and a cross-linker trimethylolpropane trimethacrylate (0.35 parts).

The mixture was stirred vigorously to the desired droplet size and the polymerisation was performed in a sealed container at 57° C. for 20 Hr.

The result was an unstable system with mostly agglomerates and a poor yield of microspheres.

Example 30—Comparative

A dispersion comprising water (255 parts), colloidal silica (Bindzil 40 wt %, 220 m$^2$/g, particle size 12 nm) (6 parts), chromium nitrate (0.15 parts), a reducing agent sodium formaldehydesulfoxylate (0.05 parts), polymerisation catalyst di(4-tert-butylcyclohexyl) peroxydicarbonate (0.5 parts) and a poly-condensate oligomer of adipic acid and diethanol amine (0.8 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-butane (17 parts) and a cross-linker trimethylolpropane trimethacrylate (0.39 parts).

The mixture was stirred vigorously to the desired droplet size and the polymerisation was performed in a sealed container at 57° C. for 3.5 Hr and then 66° C. for 3.5 Hr.

The resultant thermally expandable thermoplastic microspheres had a particle diameter of 11.0 μm.

The thermally expandable thermoplastic microspheres were heated to form expanded microspheres and had a $T_{start}$ of 102° C. and a $T_{max}$ of 148° C. The density of the expanded microspheres was 7.3 gL$^{-1}$.

Example 31

A dispersion comprising water (244 parts), colloidal silica (Bindzil 50 wt %, 77 m$^2$/g, particle size 32 nm) surface-modified with 50% propylsilyl (hydrophobic)/50% glycerolpropylsilyl (hydrophilic) (7 parts) and polymerisation catalyst di(4-tert-butylcyclohexyl) peroxydicarbonate (0.4 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-butane (17 parts) and a cross-linker trimethylolpropane trimethacrylate (0.35 parts).

The mixture was stirred vigorously to the desired droplet size and the polymerisation was performed in a sealed container at 57° C. for 3.5 Hr and 66° C. for 2.5 Hr.

The resultant thermally expandable thermoplastic microspheres had a particle diameter of 14.4 µm.

The thermally expandable thermoplastic microspheres were heated to form expanded microspheres and had a $T_{start}$ of 102° C. and a $T_{max}$ of 153° C. The density of the expanded microspheres was 14.3 gL$^{-1}$.

Example 32—Comparative

A dispersion comprising water (210 parts), colloidal silica (Bindzil 40 wt %, 220 m$^2$/g, particle size 12 nm) (4 parts), polymerisation catalyst di(4-tert-butylcyclohexyl) peroxydicarbonate (0.6 parts) and a poly-condensate oligomer of adipic acid and diethanol amine (0.6 parts) was prepared and maintained at a pH of approx. 4.5. The aqueous dispersion was mixed with an oily phase of monomers acrylonitrile (43 parts), methyl methacrylate (12 parts), vinylidene chloride (45 parts) and blowing agent iso-butane (15 parts) and cross-linkers trimethylolpropane trimethacrylate (0.17 parts) and trimethylolpropane triacrylate (0.11 parts).

The mixture was stirred vigorously to the desired droplet size. Iron nitrate was added (0.04 parts) and the polymerisation was performed in a sealed container at 57° C. for 5 Hr and then 66° C. for 4 Hr.

The resultant thermally expandable thermoplastic microspheres had a particle diameter of 12.4 µm.

The thermally expandable thermoplastic microspheres were heated to form expanded microspheres and had a $T_{start}$ of 96° C. and a $T_{max}$ of 144° C. The density of the expanded microspheres was 11.8 gL$^{-1}$.

Example 33

A dispersion comprising water (208 parts), colloidal silica (Bindzil 50 wt %, 77 m$^2$/g, particle size 32 nm) surface-modified with 50% propylsilyl (hydrophobic)/50% glycerolpropylsilyl (hydrophilic) (8 parts) and polymerisation catalyst di(4-tert-butylcyclohexyl) peroxydicarbonate (0.6 parts) was prepared and maintained at a pH of approx. 4.5. The aqueous dispersion was mixed with an oily phase of monomers acrylonitrile (43 parts), methyl methacrylate (12 parts), vinylidene chloride (45 parts) and blowing agent iso-butane (15 parts) and cross-linkers trimethylolpropane trimethacrylate (0.16 parts) and trimethylolpropane triacrylate (0.11 parts).

The mixture was stirred vigorously to the desired droplet size and the polymerisation was performed in a sealed container at 57° C. for 5 Hr and 66° C. for 3.5 Hr.

The resultant thermally expandable thermoplastic microspheres had a particle diameter of 12.2 µm.

The thermally expandable thermoplastic microspheres were heated to form expanded microspheres and had a $T_{start}$ of 97° C. and a $T_{max}$ of 146° C. The density of the expanded microspheres was 11.0 gL$^{-1}$.

Example 34

A dispersion comprising water (208 parts), colloidal silica (Bindzil 50 wt %, 77 m$^2$/g, particle size 32 nm) surface-modified with 50% propylsilyl (hydrophobic)/50% glycerolpropylsilyl (hydrophilic) (8 parts) and polymerisation catalyst di(4-tert-butylcyclohexyl) peroxydicarbonate (0.6 parts) was prepared and maintained at a pH of approx. 4.5. The aqueous dispersion was mixed with an oily phase of monomers acrylonitrile (43 parts), methyl methacrylate (12 parts), vinylidene chloride (45 parts) and blowing agent iso-butane (15 parts) and cross-linkers trimethylolpropane trimethacrylate (0.16 parts) and trimethylolpropane triacrylate (0.11 parts).

The mixture was stirred vigorously to the desired droplet size and the polymerisation was performed in a sealed container at 57° C. for 3.5 Hr and 66° C. for 2.5 Hr.

The resultant thermally expandable thermoplastic microspheres had a particle diameter of 10.0 µm.

The thermally expandable thermoplastic microspheres were heated to form expanded microspheres and had a $T_{start}$ of 98° C. and a $T_{max}$ of 143° C. The density of the expanded microspheres was 11.5 gL$^{-1}$.

Example 35—Comparative

A dispersion comprising water (262 parts), colloidal silica (Bindzil 40 wt %, 220 m$^2$/g, particle size 12 nm) (6 parts), chromium nitrate (0.15 parts), a reducing agent sodium formaldehydesulfoxylate (0.05 parts), polymerisation catalyst di(4-tert-butylcyclohexyl) peroxydicarbonate (0.5 parts) and a poly-condensate oligomer of adipic acid and diethanol amine (0.7 parts) was prepared and maintained at a pH of approx. 4.5. The aqueous dispersion was mixed with an oily phase of monomers acrylonitrile (57 parts), methyl methacrylate (18 parts), vinylidene chloride (25 parts) and blowing agent iso-butane (16 parts) and a cross-linker trimethylolpropane trimethacrylate (0.42 parts).

The mixture was stirred vigorously to the desired droplet size and the polymerisation was performed in a sealed container at 57° C. for 7 Hr 50 min.

The resultant thermally expandable thermoplastic microspheres had a particle diameter of 7.0 µm.

The thermally expandable thermoplastic microspheres were heated to form expanded microspheres and had a $T_{start}$ of 105° C. and a $T_{max}$ of 141° C. The density of the expanded microspheres was 17.9 gL$^{-1}$.

Example 36

A dispersion comprising water (245 parts), colloidal silica (Bindzil 50 wt %, 94 m$^2$/g, particle size 32 nm) surface-modified with 50% propylsilyl (hydrophobic)/50% glycerolpropylsilyl (hydrophilic) (9 parts) and polymerisation catalyst di(4-tert-butylcyclohexyl) peroxydicarbonate (0.3 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-butane (17 parts) and a cross-linker trimethylolpropane trimethacrylate (0.35 parts).

The mixture was stirred vigorously to the desired droplet size and the polymerisation was performed in a sealed container at 57° C. for 3.5 Hr and 66° C. for 2.5 Hr.

The resultant thermally expandable thermoplastic microspheres had a particle diameter of 7.9 µm.

The thermally expandable thermoplastic microspheres were heated to form expanded microspheres and had a $T_{start}$ of 104° C. and a $T_{max}$ of 147° C. The density of the expanded microspheres was 17.2 $gL^{-1}$.

Example 37

A dispersion comprising water (246 parts), colloidal silica (Bindzil 50 wt %, 77 m²/g, particle size 32 nm) surface-modified with 50% propylsilyl (hydrophobic)/50% glycerolpropylsilyl (hydrophilic) (9 parts) and polymerisation catalyst di(4-tert-butylcyclohexyl) peroxydicarbonate (0.3 parts) was prepared and maintained at a pH of approx. 4.5. The aqueous dispersion was mixed with an oily phase of monomers acrylonitrile (58 parts), methyl methacrylate (18 parts), vinylidene chloride (24 parts) and blowing agent iso-butane (17 parts) and a cross-linker trimethylolpropane trimethacrylate (0.35 parts).

The mixture was stirred vigorously to the desired droplet size and the polymerisation was performed in a sealed container at 57° C. for 3.5 Hr and 66° C. for 2.5 Hr.

The resultant thermally expandable thermoplastic microspheres had a particle diameter of 9.2 µm.

The thermally expandable thermoplastic microspheres were heated to form expanded microspheres and had a $T_{start}$ of 104° C. and a $T_{max}$ of 146° C. The density of the expanded microspheres was 9.3 $gL^{-1}$.

Example 38—Comparative

This procedure is based on Example 1 of EP 2 327 375 A2. A dispersion comprising water (665 parts), colloidal silica (Ludox-AM 30 wt %) (54 parts), sodium chloride (180 parts), poly vinyl pyrrolidone (0.8 parts), sodium nitrite (0.02) and a polymerisation catalyst di(4-tert-butylcyclohexyl) peroxydicarbonate (2.4 parts) was prepared and maintained at a pH of approx. 2.5. The aqueous dispersion was mixed with an oily phase of monomers acrylonitrile (120 parts), methacrylonitrile (24 parts), methyl methacrylate (24 parts), ethyl acrylate (72 parts) and blowing agents iso-pentane (30 parts) and normal pentane (30 parts) and cross-linkers trimethylolpropane trimethacrylate (0.4 parts) and polyethylene glycol diacrylate (1.2 parts).

The mixture was stirred at 7000 rpm with a homomixer for 2 minutes and the polymerisation was performed in a sealed container at 57° C. for 20 Hr.

The resultant thermally expandable thermoplastic microspheres had a particle diameter of 8.6 µm.

The thermally expandable thermoplastic microspheres were heated to form expanded microspheres but they did not expand.

Filtration Experiment

Filtration experiments were carried out on Examples 30 to 38

To a filtration unit with a filtration area with a diameter of 49.5 cm and equipped with a filter paper of grade 00R is added 200 g of microsphere-containing slurry of dry (microsphere) content 25-35 wt %. An external over-pressure of 1 bar is applied.

The filtration time is determined at the point of deliquoring (i.e. just before air starts to pass through the filter cake). Typically, the dry content of the filter cake at this stage is 45-60 wt %.

FIG. 1 shows

The filtrate flow rate is calculated, and the volume of the filter cake is measured. The filter cake resistance (R) is then calculated, expressed in units of $m^{-2}$.

FIG. 1 shows the results of dewatering experiments on Comparative Example 30, and also Examples 31-36.

They demonstrate the clear advantages of the present method and the thermally expandable thermoplastic microspheres in reducing dewatering times (i.e. reducing filtering resistance).

Having thus described the present invention and the advantages thereof, it should be appreciated that the various aspects and embodiments of the present invention as disclosed herein are merely illustrative of specific ways to make and use the invention.

The various aspects and embodiments of the present invention do not limit the scope of the invention when taken into consideration with the appended claims and the foregoing detailed description.

What is claimed is:

1. A process for the manufacture of thermally expandable thermoplastic microspheres, the process comprising:
   providing a mixture of monomeric materials suitable for polymerisation to form a thermoplastic polymer and at least one blowing agent,
   providing a colloidal silica that is surface-modified with at least hydrophobic organosilane groups;
   contacting the mixture of one or more monomers and at least one blowing agent with the surface-modified colloidal silica and forming an o/w emulsion comprising droplets of the mixture of one or more monomers and the at least one blowing agent in an aqueous phase; and
   polymerising the one or more monomers in the droplets to form an aqueous slurry and/or wet cake of thermally expandable thermoplastic microspheres,
   wherein the colloidal silica is modified with the hydrophobic organosilane groups that are alkylsilyl groups, vinylsilyl groups, and/or phenylsilyl groups, and is further surface-modified with hydrophilic organosilane groups being glycerol propyl silyl groups.

2. The process according to claim 1, wherein the colloidal silica that is surface-modified with the hydrophobic organosilane groups have a particle size of 2-150 nm, when calculated from the specific surface area (SSA) in m²/g according to the formula 2727/SSA.

3. The process according to claim 1, wherein the colloidal silica that is surface-modified with the hydrophobic organosilane groups has a degree of surface modification (DM) of up to 190%, wherein 190% means an amount of 4.5 µmol hydrophobic organosilane groups per m² of the colloidal silica, and wherein DM is calculated according to the equation:

$$DM = N_{Sil}W_{CS} \times C_{CS} \times SA_{CS}$$

in which;
DM is the Degree of Surface Modification in units of µmol m$^{-2}$
$N_{sil}$ is the quantity of organosilane added to colloidal silica in units of µmol $W_{CS}$ is the weight of colloidal silica before it is surface modified in units of g (grams)

$C_{CS}$ is the percentage by weight of silica in the colloidal silica before it is surface-modified; and $SA_{CS}$ is the surface area of the silica in the colloidal silica before it is surface modified, the surface area being calculated by Sears Titration, in units of m² g⁻¹.

4. The process according to claim 1, wherein a proportion of the degree of surface modification of the hydrophobic organosilane groups/the hydrophilic organosilane groups is from 15%/85% to 60%/40%.

5. The process according to claim 1, wherein a polymerisation catalyst is also provided.

6. The process according to claim 5, in which the polymerisation catalyst is an organic peroxide.

7. The process according to claim 5, in which the polymerisation catalyst is mixed with the surface-modified colloidal silica before contact with the mixture comprising one or more monomeric materials and at least one blowing agent.

8. The process according to claim 1, in which the aqueous slurry is dewatered to form the wet cake of thermally expandable thermoplastic microspheres.

9. The process according to claim 1, in which the aqueous slurry and/or wet cake is dried to form dry thermally expandable thermoplastic microspheres.

10. A process for producing expanded microspheres, comprising manufacturing thermally expandable thermoplastic microspheres according to claim 1, and expanding them by heating.

11. Expanded microspheres obtained by the process of claim 10.

12. Thermally expandable thermoplastic microspheres obtained by the process according to claim 1.

13. The thermally expandable thermoplastic microspheres of claim 12 that are in dry form or in the form of an aqueous slurry or a wet cake.

14. A product manufactured using the thermally expandable thermoplastic microspheres of claim 12.

15. The process according to claim 1, wherein the alkylsilyl groups are chosen from methylsilyl, dimethylsilyl, trimethylsilyl, propylsilyl, octylsilyl, mercaptopropylsilyl, methacrylamidopropylsilyl and iso-butylsilyl groups.

16. The process according to claim 1 wherein the hydrophobic organosilane groups include propylsilyl groups.

17. The process according to claim 1 wherein the mix of monomeric materials comprises acrylonitrile, methyl methacrylate, and vinylidene chloride, the blowing agent comprises iso-butane, and the emulsion comprises a cross-linker comprising trimethylolpropane tri-(meth)acrylate.

18. The process according to claim 17 wherein a polymerisation catalyst is provided and is di(4-tert-butylcyclohexyl) peroxydicarbonate.

19. A process for the manufacture of thermally expandable thermoplastic microspheres, the process comprising:
providing a mixture of monomeric materials suitable for polymerisation to form a thermoplastic polymer and at least one blowing agent,
providing a colloidal silica that is surface-modified with at least hydrophobic organosilane groups;
contacting the mixture of one or more monomers and at least one blowing agent with the surface-modified colloidal silica and forming an o/w emulsion comprising droplets of the mixture of one or more monomers and the at least one blowing agent in an aqueous phase; and
polymerising the one or more monomers in the droplets to form an aqueous slurry and/or wet cake of thermally expandable thermoplastic microspheres,
wherein the colloidal silica is modified with the hydrophobic organosilane groups that are alkylsilyl groups, vinylsilyl groups, and/or phenylsilyl groups, and is further surface-modified with hydrophilic organosilane groups; and
wherein the colloidal silica that is surface-modified with at least hydrophobic organosilane groups has a degree of surface modification (DM) of up to 190%, wherein 190% means an amount of 4.5 µmol hydrophobic organosilane groups per m² of the colloidal silica, and
wherein DM is calculated according to the equation:

$$DM = N_{sil} W_{CS} \times C_{CS} \times SA_{CS}$$

in which;
DM is the Degree of Surface Modification in units of µmol m⁻²;
$N_{sil}$ is the quantity of organosilane added to colloidal silica in units of µmol;
$W_{CS}$ is the weight of colloidal silica before it is surface modified in units of g (grams);
$C_{CS}$ is the percentage by weight of silica in the colloidal silica before it is surface-modified; and
$SA_{CS}$ is the surface area of the silica in the colloidal silica before it is surface modified, the surface area being calculated by Sears Titration, in units of m² g⁻¹; and
wherein a proportion of the degree of surface modification of hydrophobic organosilane groups/hydrophilic organosilane groups is 50%/50%.

20. The process according to claim 19 wherein the mix of monomeric materials comprises acrylonitrile, methyl methacrylate, and vinylidene chloride, the blowing agent comprises iso-butane, and the emulsion comprises a cross-linker comprising trimethylolpropane tri-(meth)acrylate.

21. A process for the manufacture of thermally expandable thermoplastic microspheres, the process comprising:
providing a mixture of monomeric materials suitable for polymerisation to form a thermoplastic polymer and at least one blowing agent,
providing a colloidal silica that is surface-modified with at least hydrophobic organosilane groups;
contacting the mixture of one or more monomers and at least one blowing agent with the surface-modified colloidal silica and forming an o/w emulsion comprising droplets of the mixture of one or more monomers and the at least one blowing agent in an aqueous phase; and
polymerising the one or more monomers in the droplets to form an aqueous slurry and/or wet cake of thermally expandable thermoplastic microspheres,
wherein the colloidal silica is modified with propylsilyl and glycerolpropylsilyl groups,
wherein the mixture of monomeric materials comprises acetonitrile, methylmethacrylate, and vinylidene chloride,
wherein the at least one blowing agent comprises isobutane, and
wherein the emulsion further comprises a cross-linker comprising trimethylolpropane-trimethacrylate, trimethylolpropane tri-acrylate, or combinations thereof.

* * * * *